(12) United States Patent
Kelly

(10) Patent No.: US 9,200,941 B1
(45) Date of Patent: Dec. 1, 2015

(54) SWIVELING CHECK PLUG FOR HEAVY-DUTY COMMERCIAL GEAR SYSTEM HOUSINGS

(71) Applicant: Justin Kelly, St. Augustine, FL (US)

(72) Inventor: Justin Kelly, St. Augustine, FL (US)

( * ) Notice: Subject to any disclaimer, the term of this patent is extended or adjusted under 35 U.S.C. 154(b) by 196 days.

(21) Appl. No.: 13/842,893

(22) Filed: Mar. 15, 2013

(51) Int. Cl.
  *G01F 23/00* (2006.01)
  *G01F 23/04* (2006.01)

(52) U.S. Cl.
  CPC .................................... *G01F 23/04* (2013.01)

(58) Field of Classification Search
  None
  See application file for complete search history.

(56) References Cited

U.S. PATENT DOCUMENTS

| | | | |
|---|---|---|---|
| 1,908,196 A | 5/1933 | Talbot | |
| 2,544,262 A | 3/1951 | Hall | |
| 3,186,224 A | 6/1965 | Mair | |
| 3,316,763 A | 5/1967 | Giers | |
| 3,453,886 A | 7/1969 | Avrea | |
| 3,455,163 A | 7/1969 | Lukas et al. | |
| 3,524,066 A | 8/1970 | Blakkan | |
| 3,625,310 A | 12/1971 | Herrick | |
| 3,703,038 A * | 11/1972 | Smith | 33/725 |
| 3,735,638 A | 5/1973 | Miller | |
| 3,796,098 A | 3/1974 | Trayer | |
| 3,818,759 A | 6/1974 | Cremer et al. | |
| 3,866,789 A | 2/1975 | Lambert | |
| 4,441,364 A | 4/1984 | Montie | |
| 4,522,170 A | 6/1985 | Lenk et al. | |
| 4,583,293 A | 4/1986 | Smith | |
| 4,831,877 A | 5/1989 | Snow | |
| 4,845,486 A | 7/1989 | Knight et al. | |
| 4,942,669 A | 7/1990 | Schnedl | |
| 5,022,495 A * | 6/1991 | Lavender | 184/105.1 |
| 5,025,946 A | 6/1991 | Butkovich et al. | |
| 5,076,708 A | 12/1991 | Pierson | |
| 5,086,943 A * | 2/1992 | Poskie | 220/374 |
| 5,099,584 A * | 3/1992 | Williams | G01F 23/045 15/220.4 |
| 5,113,594 A | 5/1992 | Ishihara et al. | |
| 5,485,681 A * | 1/1996 | Hitchcock | 33/722 |
| 5,808,187 A | 9/1998 | Gooden et al. | |
| 5,829,153 A * | 11/1998 | Hitchock | 33/728 |
| 6,289,601 B1 * | 9/2001 | Bricker | G01F 23/04 33/722 |
| 6,652,664 B2 | 11/2003 | Durocher et al. | |
| 6,779,421 B2 | 8/2004 | Arnold et al. | |
| 6,822,565 B2 | 11/2004 | Thomas et al. | |
| 6,840,100 B1 | 1/2005 | Wotiz | |
| 6,936,169 B2 | 8/2005 | Baumann et al. | |
| 7,114,391 B2 | 10/2006 | Sasaki et al. | |
| 7,131,213 B2 * | 11/2006 | Dougherty | G01F 23/04 33/722 |
| 7,134,220 B2 * | 11/2006 | Porter | G01F 23/04 33/722 |
| 7,360,671 B2 | 4/2008 | Slade | |

(Continued)

*Primary Examiner* — Andre Allen
(74) *Attorney, Agent, or Firm* — Wyatt, Tarrant & Combs, LLP; Stephen C. Hall

(57) ABSTRACT

A check plug that incorporates a gravity-induced attached swiveling dipstick component is provided. Such a device facilitates the measurement of fluid levels for gear system housings without the need for traditional high profile, cumbersome methods and tools. The swivel aspect coupled with a suitable connected dipstick measurement component allows the user to open the housing through a screwed-in (or other reliably connected) plug and raise the plug to a proper level to read the fluid level on the dipstick measurement component. Once such a measurement is completed, the plug can be placed back in a secure manner to the target housing and the dipstick will remain swiveled downward towards, at least (and preferably immersed to a certain degree) within the subject measured fluid. The method of performing such a measurement with the inventive check plug is also contemplated herein.

6 Claims, 6 Drawing Sheets

(56) References Cited

U.S. PATENT DOCUMENTS

| | | |
|---|---|---|
| 7,475,665 B2 | 1/2009 | Ketelhohn et al. |
| 2002/0108438 A1 * | 8/2002 | Williams et al. ............ 73/290 B |
| 2002/0189344 A1 * | 12/2002 | Dougherty et al. ......... 73/290 R |
| 2003/0061875 A1 * | 4/2003 | Dougherty et al. ......... 73/290 R |
| 2008/0314141 A1 * | 12/2008 | Keith et al. ................. 73/290 R |

\* cited by examiner

SWIVELING CHECK PLUG FOR HEAVY-DUTY COMMERCIAL GEAR SYSTEM HOUSINGS

FIELD OF THE INVENTION

A check plug that incorporates a gravity-induced attached swiveling dipstick component is provided. Such a device facilitates the measurement of fluid levels for gear system housings without the need for traditional high profile, cumbersome methods and tools. The swivel aspect coupled with a suitable connected dipstick measurement component allows the user to open the housing through a screwed-in (or other reliably connected) plug and raise the plug to a proper level to read the fluid level on the dipstick measurement component. Once such a measurement is completed, the plug can be placed back in a secure manner to the target housing and the dipstick will remain swiveled downward towards, at least (and preferably immersed to a certain degree) within the subject measured fluid. The method of performing such a measurement with the inventive check plug is also contemplated herein.

BACKGROUND OF THE INVENTION

Heavy-duty machinery, whether it be transport vehicles, construction devices, planes, etc., all require vigilant maintenance to ensure peak if not safe performance. Lubricating fluids are utilized to a great extent within such machinery to allow for proper and reliable gear movement, piston utilization, transmission reliability, and the like. If such a fluid is depleted to an appreciable level, the performance of the subject vehicle may be compromised and the overall effectiveness, if not safety, thereof may be drastically reduced, too. Thus, there is a constant need to provide a safe, reliable, and, hopefully, "clean" way to monitor such fluid levels. Typically, engineering has not taken into effect such a monitoring factor when designing component machinery parts of this type. Although there are manners and methods to undertake such fluid measurements, these are generally taxing on the user (i.e., in difficult to reach places) and thus require great dexterity to undertake or normally require a "messy" act to first reach the specific location and then to actually provide the measurement capability thereafter.

For instance, the traditional way of determining fluid levels in a large majority of heavy-duty commercial gear housings is to begin by removing the factory fill plug. Typically, the measurement step involves the undesirable insertion of one's own index finger into the plug location opening on the housing to the level that fluid is actually found within the reservoir. Thus, the distance the fluid registers in relation to the user's first knuckle has been one possible way of determining the fluid levels present therein. By any standard, such a measurement method is not "clean" and may not be terribly reliable either. With a usual determination that the registration of fluid on one's finger indicates a fluid level within a safe operational range, it is evident that there is a need to provide greater reliability and less "messy" a method for measurement purposes of this type. Needless to say, such a finger-based measurement may transfer contaminants, such as dirt and grime, not only into the lubricating fluid itself, but the user must undertake a cleaning regimen after each procedure of this sort to ensure their own safety. The delicate nature of a typical gear system militates against a measurement protocol that undertakes such a jeopardizing "finger test" because of these contaminant potentials. Yet, despite these issues, there have been scant few suggestions that have been attractive enough for machinery operators and users to avoid such a simple, albeit, questionable monitoring process. Although there are externally provided devices that allow for introduction and immersion within such machinery reservoirs to measure fluid levels (such as metal dipsticks that are stored outside the reservoir, vessel, manifold, etc.), such devices are just as susceptible to contamination possibilities as the "finger test" procedures. Any time an external implement is introduced within such a fluid container, in other words, the overall potential for contaminant introduction within such delicate machinery is increased. As such, there remains a significant desire within the heavy machinery industry, at least, to provide a suitable way to avoid external implement introduction for lubricating fluid measurement purposes. The ability to do so with a device or article that may be provided as a proper add-on for contaminant prevention rather than intrusion through its presence would be highly prized as well. To date, such a device has yet to accorded the heavy machinery industry.

ADVANTAGES AND SUMMARY OF THE INVENTION

One distinct advantage of this invention is the ability to measure fluid levels without any introduction of an external measuring source. Another advantage is the facilitation of measurement through the simple engagement of the inventive device to a typical plug location and disengagement thereof for measurements to be made. Yet another advantage of this invention is the constant measurement capability of the device, thus according a reliable measurement protocol every time the device is utilized. A further advantage is the simplicity in installing such a device without losing the plug reliability in place previously.

Accordingly, this invention encompasses a fluid measurement device that includes a check plug and an integrated swiveling dipstick that extends from and is attached to said check plug. The invention further encompasses a method of measuring the level of operational fluids within a fluid housing within a vehicle comprising the steps of a) providing a check plug that is removably attached in a secure fashion to said fluid housing to prevent contaminants from entering said housing while said check plug is attached thereto, wherein said check plug includes a swiveling dipstick integrated therein and present within said housing while said check plug is attached thereto, wherein said dipstick acts via gravity to extend said dipstick downward within said housing for continuous monitoring of fluid level therein; b) removing said check plug from said housing and removing said dipstick to a position at which a person may determine the fluid level measured therewith; and c) placing said dipstick back within said housing; and d) reattaching said check plug to said housing in a removable secure fashion.

With this inventive device and method, the user is permitted an easy manner of determining fluid levels within heavy machinery housings without the need for external contaminant introduction or otherwise requiring a situation that creates the need for sanitizing and/or cleaning one's own finger as a result. In essence, the elegant fluid measurement device and method provided herein accords a heretofore unavailable manner of simply removing a secured check plug and lifting the integrated dipstick therefrom to a position that one may read the fluid level measured thereby. Beyond the fact that this process is far "cleaner" than others described herein, and particularly those that are typically followed today for such a purpose, the beneficial disposition of the swiveling dipstick component downwards, at all times, within the fluid housing allows for constant fluid measurement capability, thus according a highly reliable measurement result.

The inventive check plug thus may be configured to either directly attach to a fluid housing opening, or may be modified through an extra connection structure to effectively connect as needed. In other words, the width (or diameter) of the housing opening (which typically is of sufficient size for a hose or like implement to transfer fluids therein as needed) may be properly taken into account and a separate connection device may be utilized to provide sufficient coverage for attachment that may then further allow for the inventive check plug to attach thereto. The basic structure of the check plug measuring device is of primary importance in that respect, although this capability of overcoming odd housing shapes and/or diameters is also potentially within the scope of the invention, too. Of great importance, however, is the proper alignment of the top portion of a register component (i.e., measuring device) that is attached to a swiveling dipstick and extends into the target fluid housing with the bottom of the housing opening when the inventive check plug is attached thereto. This configuration permits proper gauging of the depth of the subject fluid level in reference to the height of the housing opening. With such disposition in this manner, the register properly aligns for suitable fluid level determinations with the housing opening (in other words, properly replaces the standard "finger" test that utilizes the same depth comparison but with a person's own fingers rather than an internally disposed device). The necessity, then, of properly aligning the inventive check plug within the housing opening to this degree thus will typically require the utilization of a stationary secondary plug to that extent. The ability to manipulate such a secondary plug to the proper angle for the viable connection to be made between the secondary and check plug with the register component then aligned to the proper height in relation to the housing opening is facilitated in such a manner. On rare occasions would the utilization of the check plug alone be sufficient to meet such a requirement; thus, the inclusion of a stationary secondary plug is also within the scope of the invention.

Thus, such an inventive device can be modified as needed to fit the opening previously filled by a factory plug for contaminant prevention purposes (as well as access for fluid introduction and/or measurement). The inventive plug thus provides a manner of facilitating fluid measurement in a clean manner that effectively eliminates the introduction of external (and possibly damaging) contaminants within an array of heavy-duty gear housings, particularly, as noted above, with the dipstick register properly aligned to permit proper depth assessment of the subject fluid level therein in relation to the height of the housing opening itself.

The inventive check plug measurement device and method of use thereof functions by combining a small number of prefabricated and machined parts so that the internal workings of the primary check plug create a swiveling action for the dipstick. Therefore, by the weight of its registration end, the dipstick is kept, due to gravity, in the down position immersed (to a certain level at least) within the subject fluid or within the range where such subject fluid should be present within the target gear housing. If necessary, a stationary secondary plug is applied securely (such as, for instance, screwed and firmly tightened) into the factory plug location of the target gear housing (thus allowing for removal and possible disposal of such a factory plug as a result). The dipstick also remains in the down position while removing (i.e., again, screwing) the primary check plug into and back out of the factory plug opening on the target gear housing (and, if present, through the supplemental stationary secondary plug). To check fluid levels within the target gear housing, the primary check plug is screwed into the housing opening (again, possibly and potentially preferably, depending on the initial factory plug opening size, via the secondary plug). The registration end of the dipstick is submerged within at least a portion of the subject fluid (unless such subject fluid has been depleted to too great a level for measurement to be made; in that situation, it is evident that fluid replacement would thus be necessary) contained within the target gear housing. The dipstick is preferably configured to dispose (and thus suspend) its registration end within the area of the target housing in which optimal fluid levels should be maintained. As fluid levels expand and recede, due to temperature variables, for instance, the length of the registration end of the dipstick thus is properly configured to monitor and display the safe range of the subject fluid for proper operations of the vehicle at issue. By replacing the factory housing plug with the inventive measuring check plug, the permitted method of use allows for facilitation of subject fluid level maintenance within the target gear housing. Additionally, as noted above, such a device and method significantly reduces the chances of contamination from external sources within the target gear housing as well.

DETAILED DESCRIPTION OF THE DRAWINGS AND PREFERRED EMBODIMENTS

In order to provide greater detail of the inventive electrical device, non-limiting drawings and descriptions thereof. The ordinarily skilled artisan would understand that the scope of the overall invention is not intended to be limited in view of such drawings and descriptions.

Figure 1:
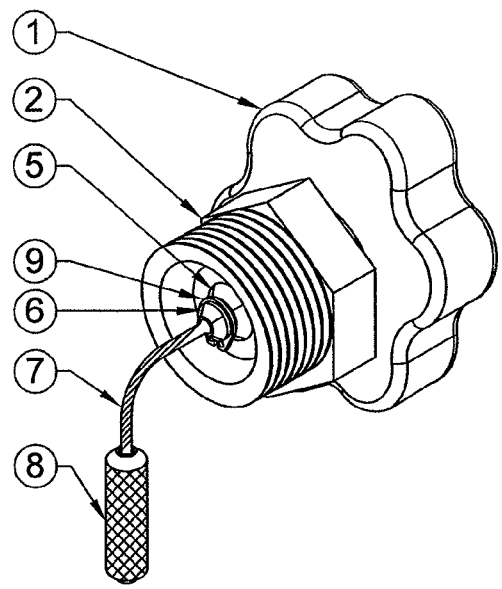
FIG. 1 shows an isometric view of one potentially preferred embodiment of the invention completely assembled and ready for use in within a gear housing and including a secondary stationary plug.
Figure 2:
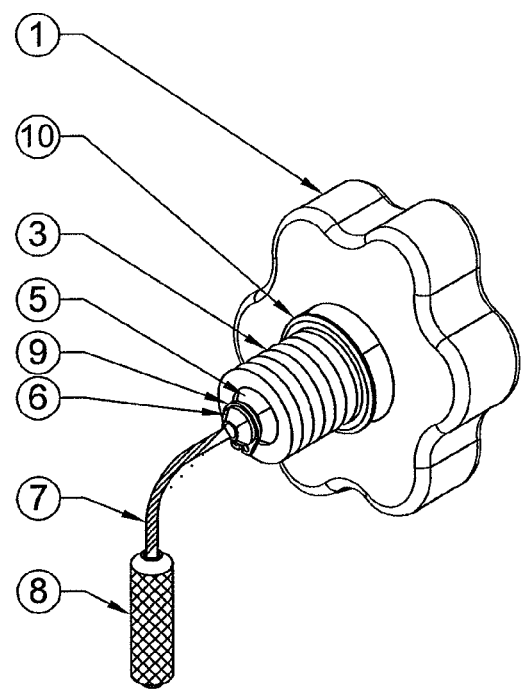
FIG. 2 depicts an isometric view of an a potentially preferred embodiment of FIG. 1 without the secondary stationary plug.
Figure 3:
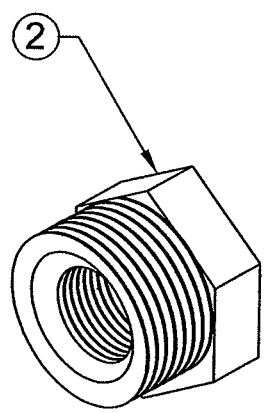
FIG. 3 depicts an isometric view of a potentially preferred stationary secondary plug.
Figure 4:
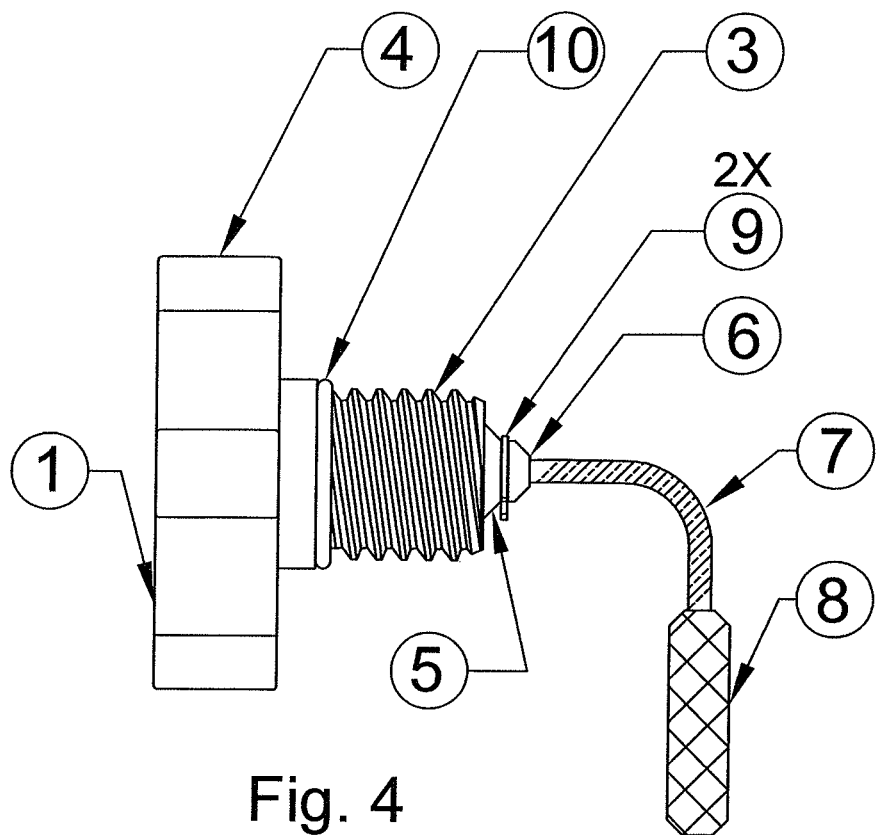
FIG. 4 shows a side view of a potentially preferred inventive check plug.
Figure 5:
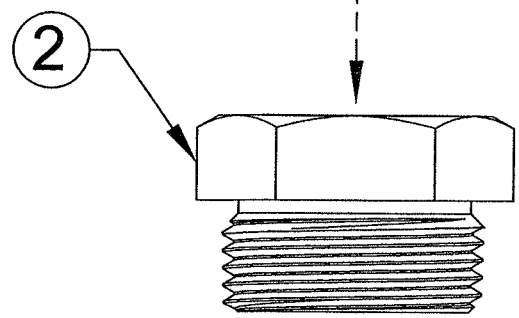
FIG. 5 shows a side view of an inventive stationary secondary plug.
Figure 6:
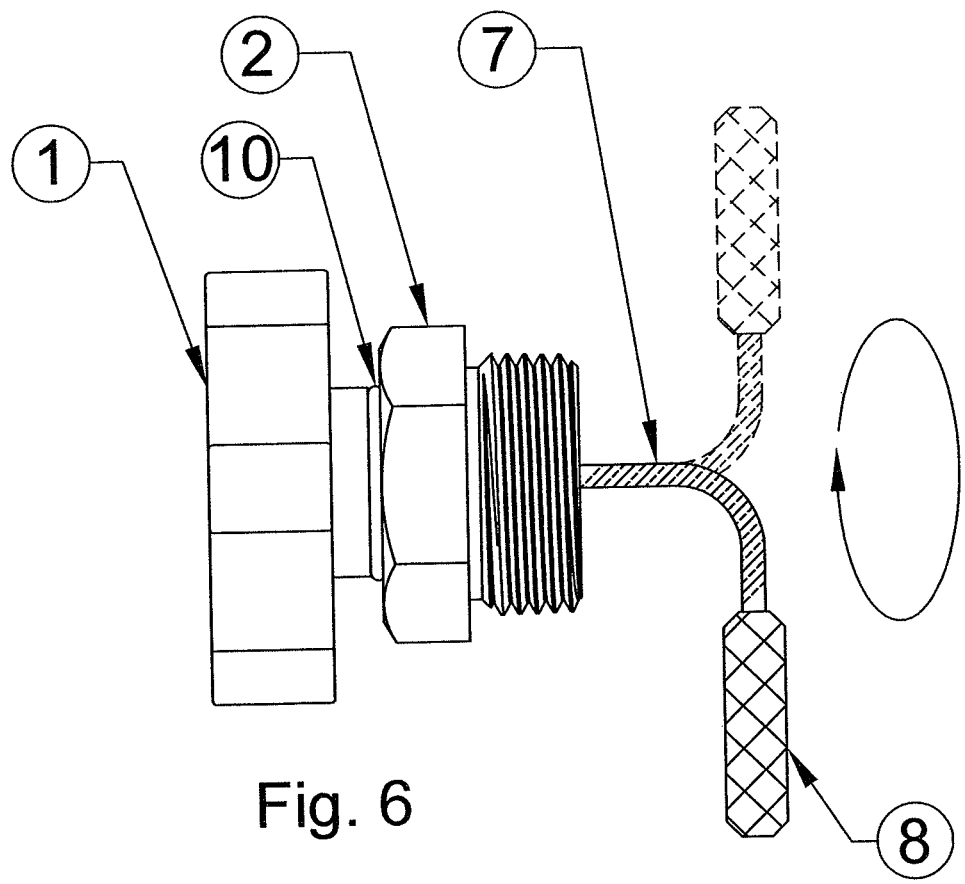
FIG. 6 shows the device in FIG. 1 in side view.
Figure 7:
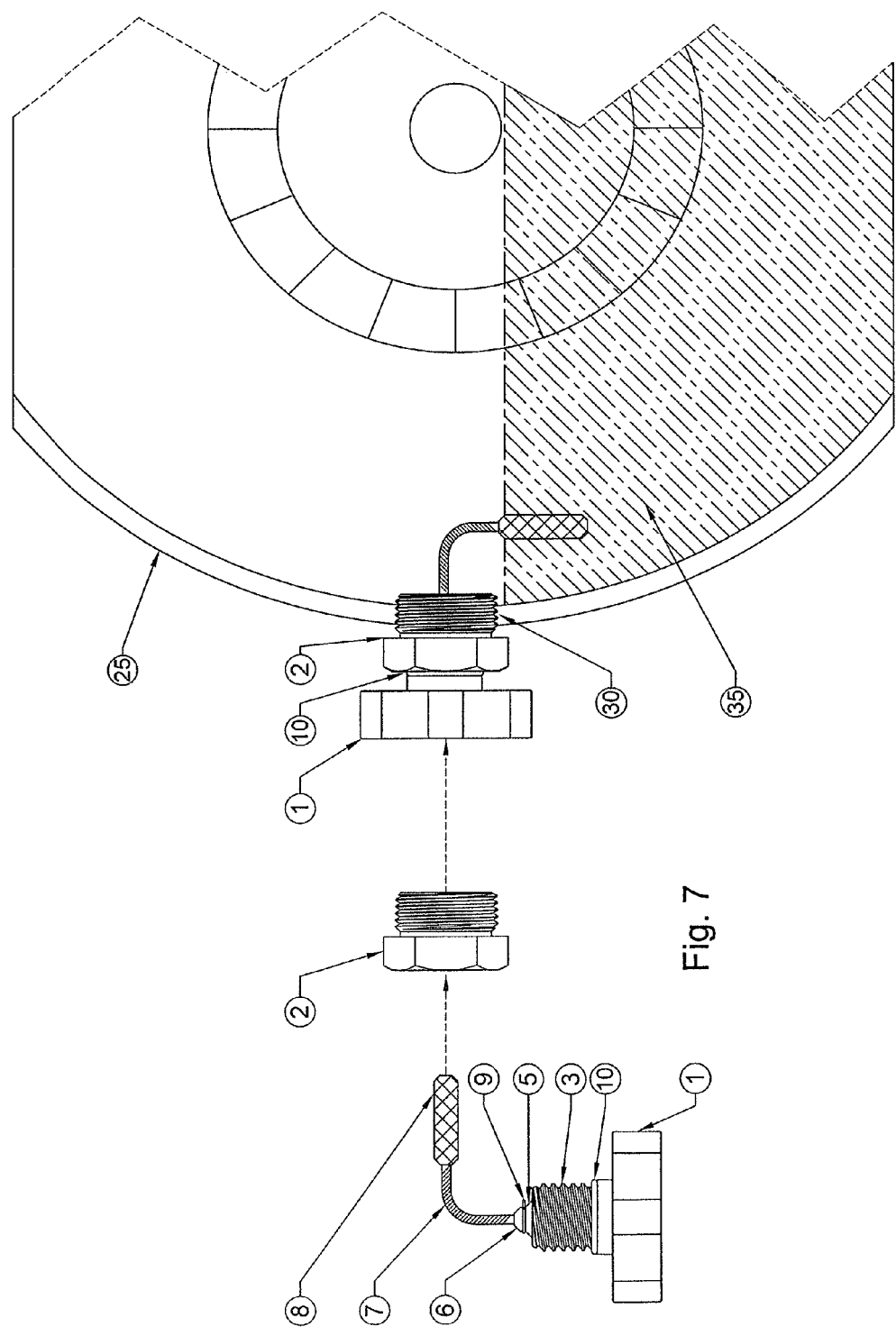
FIG. 7 shows a method of introducing the inventive device of FIG. 2 within a target gear housing for fluid level measurement.
Figure 8:
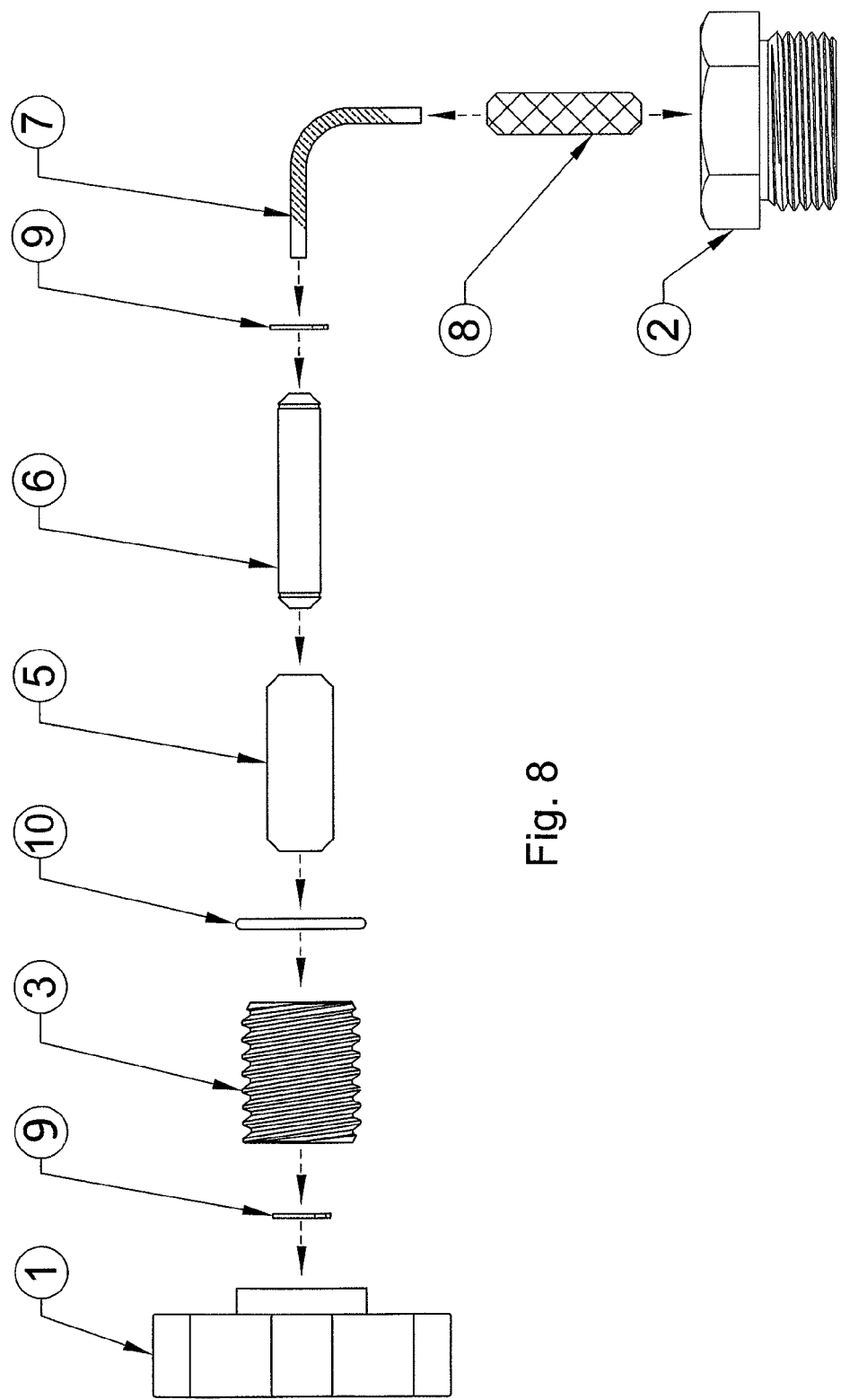
FIG. 8 is an exploded view of the device of FIG. 1.

FIGS. 1-8 show one potentially preferred embodiment of the invention. The different figures show the check plug device in different views and thus will be described with FIGS. 1-6 pertaining to the same structures. FIG. 8 is an exploded view and will be described appropriately in that manner. FIG. 7 shows the device utilized for a measurement purpose.

As such, in FIGS. 1-6, the inventive check plug 1 includes an externally located head (turn knob) 4 that may be manipulated via rotation (e.g., screw-motion, with any number of revolutions necessary for secure connection) and that is too large for introduction within a housing opening (30 in FIG. 7), but of sufficient size to allow a user suitable torque access for proper attachment and detachment to occur on demand. The plug 1 thus will preferably include a sealing ring 10 (O-ring, for example) within the housing and at the opening/head interface (30 of FIG. 7) to provide a reliable insulating boundary for contaminant prevention and/or sequestration. A threaded base 3 is thus present to allow for attachment to a housing opening (such a size is not illustrated) or a stationary secondary plug 2 that compensates for the wide opening of a housing (30 of FIG. 7). This secondary plug 2 allows, as well, for a uniform shape and size of the check plug 1 and threaded base 3 for manufacturing simplification, if desired. The threaded base 3, is typically hollowed out internally, at least to a certain depth, to permit connection of a nylon tubing sleeve 5, a center steel tubing pin 6, and two steel snap rings 9 to connect the wire dipstick 7 to the base 3. The dipstick 7 extends outwardly and then perpendicularly from the base 3 in order to allow for reach within a target fluid housing (25 of FIG. 7). Attached to the dipstick 7 is a registration end 8 that includes markings 22 for facilitation of fluid level measurements thereby.

FIG. 8 shows the exploded view of the device, thus allowing for a manufacturing scheme to be described. The plug 2, tubing 6, 8, braided wire (dipstick) 7 and threaded base (stock) 3 are all comprised of stainless steel of specific sizes, lengths and diameters for the particular application. Also included are a length of nylon tubing 5 of specific inner and outer diameters, steel retaining rings 9, an O-ring 10, and a lobed polyurethane turn knob 4. Beginning with the desired stationary secondary steel plug 2, one should center drill completely through with a specific diameter. It is then thread-tapped through to a certain length within to adapt the required length of threaded stock 3. The insertion side 24 of the plug 2 is then groove tapered out to a specific diameter and depth at a specific angle to match that of a housing opening (30 of FIG. 7). The inside of the plug 26, on the gear housing side, is then tapered in to a certain diameter and depth to match the dimensions of the housing opening (30 of FIG. 7) as well. The specific length of threaded stock 3 is then bored completely through to a specific inner diameter relevant to the outer diameter of the length of nylon tubing 5. The nylon tubing 5 is then pressed into, and secured firmly inside, the length of threaded stock 3. The nylon tubing 5 and threaded stock 3 are to be of the same specific length. Placed inside the nylon tubing 5 is a slightly longer length of steel tubing 6 with a specific outer diameter relevant to the specific inner diameter of the nylon tubing, now serving as a sleeve. This gives the steel tubing 6 the ability to turn within the nylon sleeve 5 creating the signature swiveling action of the invention. The steel tubing 6 is then clamped, at each end, using the two small steel retaining rings 9 into grooves, located within a specific length of one another, to encompass the steel threaded stock 3, nylon sleeve 5, and steel tubing 6 as a unit. The outer tip of the clamped steel tubing 6 within the nylon sleeve 5 is beveled down to a 45° narrowed end. Inserted into the outer, narrowed end of the steel tubing 6 is a preformed steel braided wire 7, with an outer diameter relevant to the inner diameter of the steel tubing 6, in the comparable shape of a right angle. It is pressed into the steel tubing 6 to a certain depth and permanently fused into place by the aid of a high temperature, metal bonding epoxy. The steel tubing with the inserted braided wire is now referred to as the center pin 6. At the bottom end of the preformed wire, referred to now as the dipstick 7, is another specific length of steel tubing 8. This element is referred to as the registration end 8 and is fused to the dipstick 7 with the same bonding agent used with the dipstick 7 and center pin 6. The registration end 8 serves as the operational fluid site for the dipstick 7 and can be manufactured of a different type of steel, so that it can be magnetized to collect any minuscule metal particles that may floating in the fluid due to operation of the gear system. Now, the lobed turn knob 4 has been drilled and thread-tapped into a specific depth and diameter to adapt the encompassed threaded stock 3 end, opposite of the dipstick 7 side. The durable, high-temp polyurethane lobed turn knob is the last component to add and fuse down to complete the embodiment, referred to now as the primary check plug 1. The turn knob 4 serves as the site for hand torque tightening the primary check plug 1, for insertion and exertion to and from the stationary secondary plug 2, applicable to the gear housing (25 of FIG. 7) selected. Finally, an O-ring 10 of specific dimensions is rolled up the length of the threaded stock 3 of the primary check plug 1 into a groove where it is butted against the base of the turn knob 4. When the primary check plug 1 is tightened down and the O-ring is pressed into the tapered groove of the stationary secondary plug 2, the O-ring then acts as a lock washer to prevent the primary check plug from unintentionally backing out of the stationary secondary plug 2, due to vibration. Also, acting as a seal to keep the fluid from leaking outside of the gear housing (25 of FIG. 7) between the two counterparts of the embodiment.

FIG. 7 thus shows the device 1 applied to a housing 25 for measurement of a fluid 35 therein. At the opening 30, the stationary plug 2 allows for secure attachment of the check plug 1 such that it can be removed 40 and checked for determination 45 of fluid levels 35 on the registration end 8 of the dipstick 7. As well, such a plug 2 allows for proper alignment of the register 8 to the height of the housing opening itself, as noted previously. As shown, the swivel effect of the dipstick 7 continuously allows for disposition of the dipstick 7 within the housing 25 for such a purpose. With a potentially magnetized registration end 8, the device 1 may also be utilized to not only measure fluid levels 35, but remove metallic contaminants as well from the housing 25.

Thus, a suitable alternative to typical measurement methods is provided that safely, cleanly, and reliably measurements fluid levels on demand without contamination or otherwise introduction of external objects within the fluid housing for such a purpose.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What I claim is:

1. A fluid measurement device that includes a check plug and an integrated swiveling dipstick that extends from and is attached to said check plug, wherein said dipstick is configured with a perpendicular bend and a registration end having a top and bottom, wherein said registration end includes indicia for fluid level measurements, and wherein said registration end is weighted to ensure downward disposition of said swiveling dipstick.

2. The device of claim 1 further including a stationary secondary plug component for proper alignment capability within a fluid housing opening.

3. A method of measuring the level of operational fluids within a fluid housing within a vehicle comprising the steps of:
   a) providing a check plug that is removably attached in a secure fashion to an opening within said fluid housing to prevent contaminants from entering said housing while said check plug is attached thereto, wherein said check plug includes a swiveling dipstick integrated therein having a perpendicular bend and a downwardly extended register attached thereto, and wherein said dipstick acts via gravity to extend said register downward within said housing for continuous monitoring of fluid levels therein when said plug is attached to said fluid housing opening;

b) removing said check plug from said housing and removing said dipstick to a position at which a person may determine the fluid level measured therewith;

c) placing said dipstick back within said housing; and d) reattaching said check plug to said housing in a removable secure fashion, wherein said dipstick swivels downward such that said register is vertical within said operational fluid.

4. The method of claim 3 wherein said check plug is aligned such that the register is level with the bottom of the fluid housing opening.

5. The method of claim 3 wherein said check plug is attached to said fluid housing opening through a stationary secondary plug.

6. The method of claim 4 wherein said check plug is attached to said fluid housing opening through a stationary secondary plug.

\* \* \* \* \*